J. BAILEY.
Coopers' Crozes.

No. 139,852.

Patented June 17, 1873.

Witnesses
Nelson A. Hunt
John W. Bailey

Inventor
James Bailey

UNITED STATES PATENT OFFICE.

JAMES BAILEY, OF SPRINGPORT, INDIANA.

IMPROVEMENT IN COOPERS' CROZES.

Specification forming part of Letters Patent No. 139,852, dated June 17, 1873; application filed September 7, 1872.

*To all whom it may concern:*

Be it known that I, JAMES BAILEY, of Springport, county of Henry and State of Indiana, have invented certain Improvements in Croze, of which the following is a specification:

My invention relates to an improvement in coopers' croze, wherein the bits or cutters are held in place in a peculiar manner, hereinafter described, by means of a loop which holds the bits down flatly upon the block to which they are attached.

Figure 1:
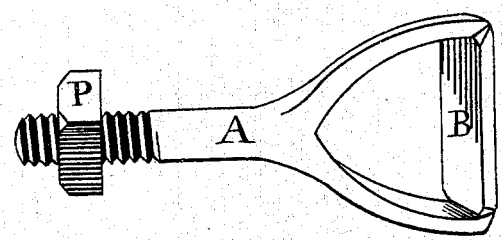
Figure 2:
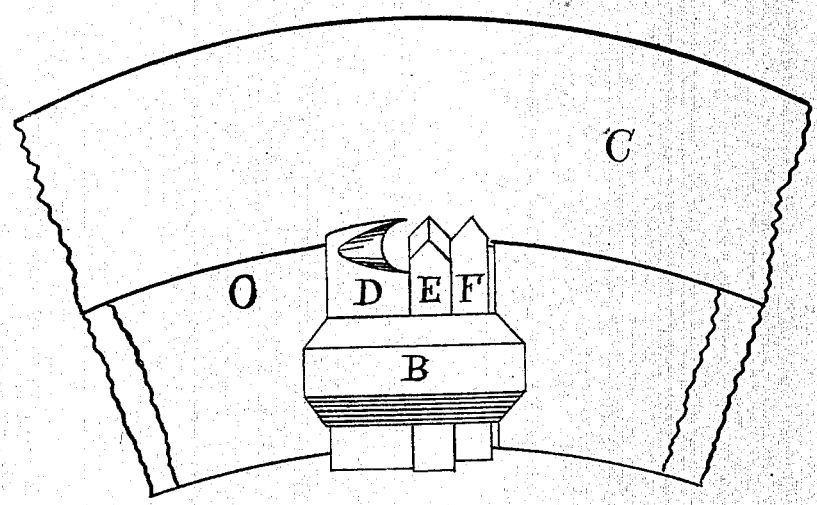

Figure 1 is a view of the loop with its shank A and nut P attached. Fig. 2 is a plan or top view of the blocks to which the whole is attached, and showing the bits held down by the loop.

B is the loop, and A is the shank, which passes through the blocks O C, and is held by the nut P upon the opposite side of the blocks. The block O is fastened to the block C, and is of sufficient thickness to indicate the distance from the ends of the staves of the barrel at which it is desired to cut the croze. The bits are three in number, two of which, E and F, are made V-shaped, and beveled from one side, and are placed flat upon the block, and are reversed, the edge of one standing up, and the other down; while the third bit, D, has a vertical edge, and follows to clear out the channel cut by the forerunning V-shaped bit.

I form my loop and clamping-bolt with chamfered edges, and turn the edges slightly downward to press upon the front and rear ends of the bits and hold them firmly, and, at the same time, allow no space to be clogged by chips.

I do not claim any of the above-described arrangements or devices separately, as I am aware of the patent of John C. Hofer, of June 9, 1868; also, that of J. B. Siegfried, of September 15, 1868; but my invention consists entirely in placing the bits D E F flatly upon the block to which they are attached, and holding them in place by means of the loop B, said loop having its edges chamfered and turned slightly down to clamp the bits at their front and rear ends, and preventing clogging by chips getting under the clamping arrangement.

Having thus fully described my invention, what I claim and desire to secure by Letters Patent, is—

The bits D E F, in combination with the blocks O C and loop B, said loop having its edges chamfered and turned slightly downward to press upon the front and rear ends of the bits and hold them flatly upon the block and prevent clogging, substantially as described.

JAMES BAILEY.

Witnesses:
NELSON HUNT,
JOHN W. BAILEY.